Dec. 7, 1937. T. M. GODFREY ET AL 2,101,496
METHOD OF FINISHING SHORTENING
Filed Oct. 2, 1934
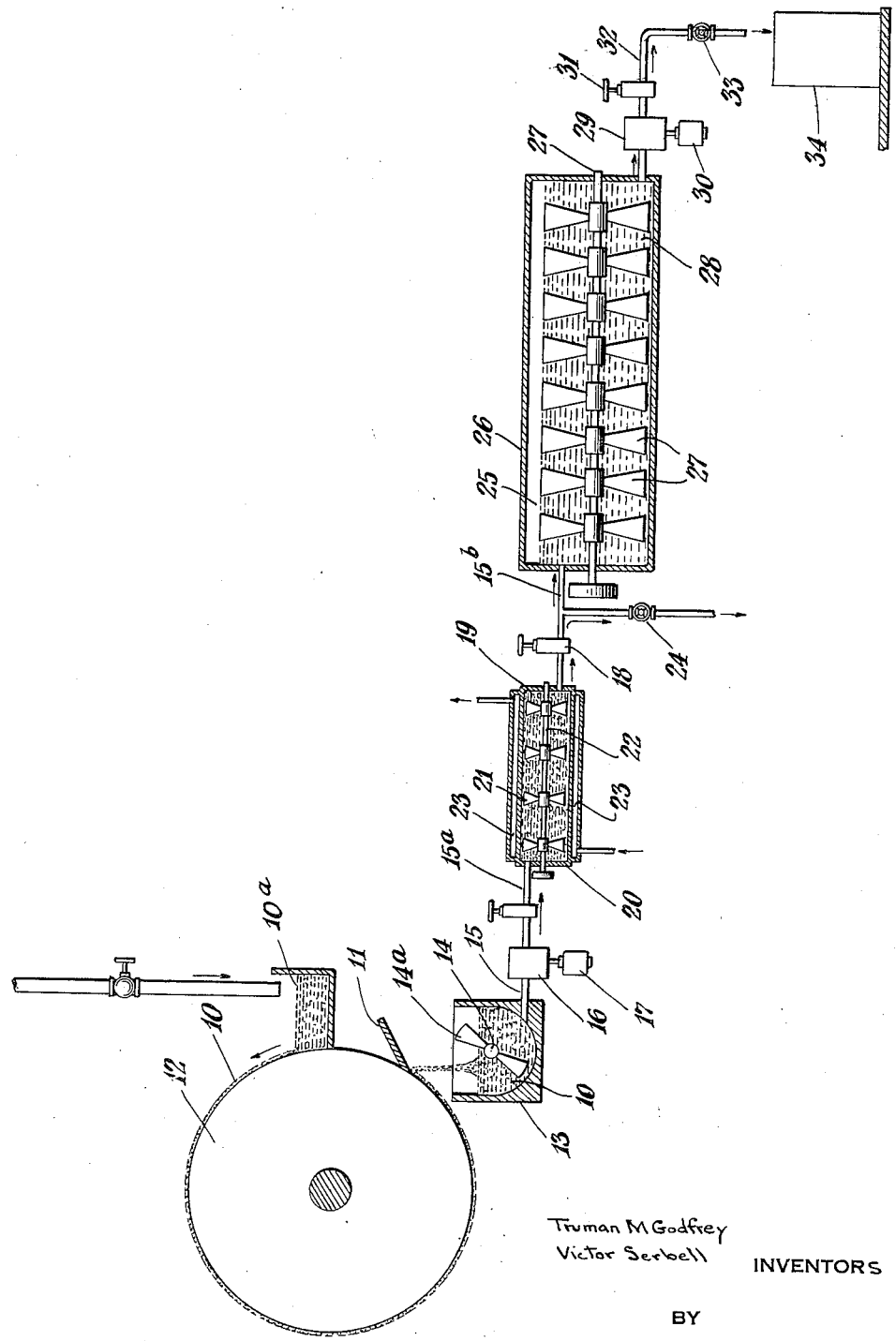
Truman M Godfrey
Victor Serbell INVENTORS
BY
Hoguet + Neary ATTORNEYS Patented Dec. 7, 1937

2,101,496

UNITED STATES PATENT OFFICE 2,101,496

METHOD OF FINISHING SHORTENING

Truman M. Godfrey Winchester, Mass., and Victor Serbell, Leonia, N. J., assignors to Lever Brothers Company, a corporation of Maine Application October 2, 1934, Serial No. 746,518

5 Claims. (Cl. 99—122)

This invention relates to an improved method of physically treating shortening, whereby the texture of the finished product is improved as regards smoothness and plasticity. Also the characteristics of the shortening are modified to improve its effect in bakery uses and its keeping qualities. The invention applies more specifically to a method of working the chilled fat as it comes from the cooling roll in such a manner as to develop certain desirable physical properties beyond those which have heretofore been possible, the resulting product being particularly suited to the baker's needs and one which will retain its desirable characteristics.

It is well known by those versed in the art of shortening manufacture that certain difficulties exist in the methods commonly used in handling the fat from the time it leaves the chilling roll until it reaches the containers. The sudden chilling of the fat by the refrigerated roll tends to produce many hard lumps, which remain in spite of subsequent working, so that the product often appears of coarse texture with streaks and small hard particles easily discernible to the eye. The crystal structure is likewise irregular and the product lacks plasticity and capacity to cream in the cake dough mix, which is essential for cake volume.

In addition to the unfavorable characteristics in the shortening which are immediately apparent as the result of the present relatively crude methods of processing the shortening after it is removed from the chilled roll, there are certain further and possibly even greater disadvantages in the shortening resulting from the ordinary processes which become apparent only upon its use or only upon the lapse of a period of time after the manufacture of the shortening. Two of the more important of these undesirable characteristics are (a) the tendency of the shortening to change in physical properties and approach a form which is more or less unattractive to the user and (b) a lack in creaming quality of the shortening so that the possibility of obtaining a fine texture and volume in a bakery product is diminished. The first of these characteristics is probably due to the fact that the supercooling of the fat on the chilled roll is not properly compensated for and balanced by subsequent operations, dependent always, of course, on the particular type of fat being processed, so that there is a continuous change in crystalline structure as the fat tends to approach its equilibrium again, which condition, however, may not be the most desirable form for bakery use. Various methods only partially successful have been attempted in order to so modify the crystalline growth and structure and so temper the fat to produce a more stable type which would be satisfactory for bakery use and which supposedly would not change in characteristics. Actually these results have never been satisfactorily accomplished. The second primary disadvantage which becomes apparent only upon use is the creaming quality of the fat. The creaming effect of the shortening is dependent primarily upon the amount of air in the fat and form of dispersion of this air. It is desirable to obtain as complete a dispersion of the air as possible and this cannot be accomplished when there are lumps in the shortening even of a type not readily apparent to the eye. Furthermore, the air dispersion is tied up to a degree with the changes in crystalline structure which are not always uniform throughout the mass. It is necessary to so completely disperse the air within the fat and so completely break down all the fat agglomerates and also to so treat the fat as to avoid any changes in characteristics as would modify to any degree this air dispersion. By the process disclosed herein the fat is so treated that the creaming quality of the shortening which varies with different fats, can be modified so as to produce a fat which in bakery use will give a cake, for example, of the most desirable volume and texture.

For many years various attempts of a somewhat crude nature have been made to approach this more desirable form of shortening but until the applicant's processes none of these methods of processing has been fully satisfactory. Among the more generally used methods which have been in operation for several years is one in which the melted fat is run over a refrigerated roll which chills the fat to such a degree as to partially solidify it. This partially solidified fat is removed from the chilled roll and falls into a picker box supplied with a rotating series of blades. The primary function of the picker box is to collect continuously the chilled layer of fat as it falls from the roll and work it into a continuous mass, beat air into it in a crude manner and convey it to the end of the trough to which it is withdrawn as fast as necessary. From the picker box the fat is commonly withdrawn by a pump and passed through a heat exchanger from which it is usually discharged into the containers. In many cases the fat is discharged from the heat exchanger into a second picker box from which it is withdrawn by means of a pump and subsequently discharged into containers. The purpose of the heat exchanger is to put back into the super-cooled fat a portion of its heat so as to facilitate the return of the fat to its normal condition, the heat added, acting with the heat of crystallization, to bring the fat back to normal condition.

To further season or nature the shortening, it also has been the customary practice for many years with all processes to store the packed fat in a tempering room for twelve hours or longer, where an even temperature is maintained at approximately 75–85° F.

An object of the invention is to provide a process for finishing shortening to impart to it a more desirable form, in which process the mechanical operations of working and smoothing the fat, dispersing and distributing the air therein, and developing of the desired physical state of the fat by agitation, heat and pressure treatments, are performed in a relatively simple and efficient manner, in order to impart a desirable appearance and texture to the shortening and to produce an improved product as reflected in the creaming volume and the loaf volume of a finished cake made with the shortening.

Another object of the invention is to so process the shortening prior to packing as to approach the desired equilibrium conditions and inhibit change in the product subsequent to packing.

In accordance with the invention, the shortening after leaving the chilling roll and conventional "picker box", is worked conditioned and then texturated under relatively high pressure conditions and in such a manner that it is particularly smooth and creamy in consistency. The pressure texturizing operation subsequently described acts to homogenize the fat and develop an even crystalline growth and prevents the presence of large fat agglomerates in the shortening. The operation of working or conditioning the shortening prior to the texturizing operation is preferably carried out under pressure with beating and heat may be added if desired. This operation conditions the shortening for the subsequent texturizing operation and permits the gentle obtention of the desired equilibrium conditions without subsequent change in the product to a less desirable form after packaging. The air content of the shortening is finely and uniformly dispersed and its physical state is developed in such a manner that the product, after filling into packages, possesses a satiny and uniform texture with improved plasticity over the products previously obtainable by the prior art method.

The treatment also results in a superior workability of the shortening product, the properties developed being particularly suited to the baker's needs as evidenced by increased creaming in the dough and greater loaf volume in the finished cake. The operation of the system used in our invention is also under strict control so that the desirable characteristics of the product may be easily maintained irrespective of the particular formula being processed.

The novel features of our invention are set forth with particularity in the appended claims. The invention itself, however, both as to its organization and method of operation, will be clearly understood by reference to the following more detailed description taken in connection with the accompanying drawing, in which the single figure represents diagrammatically a system for carrying out the process of our invention.

Referring now to the drawing, one illustrative example of the operation of our invention will be described. In accordance with this specific example, the partially solidified fat 10 which has been applied to the roll in liquid form at 10a, is scraped by some suitable device, such as a doctor blade indicated at 11, from the refrigerating roll 12, which rotates in counter-clockwise manner. As the fat is scraped from this roll it drops into a "picker box" 13. Mounted within this picker box there is a rotating shaft 14 which carries a group of blades 14a extending above the level of the fat in the picker box. When rotated these blades 14a extending beyond the top surface of the fat 10 beat air into the mass of chilled fat.

The chilled fat 10, after being beaten and aerated by the blades 14a, is withdrawn from the "picker box" 13, through the discharge line 15, by means of a pump 16. This pump 16 is operated by a suitable motor 17 and is capable of maintaining a pressure of 500–1000 pounds per square inch or more in the discharge line 15a operating against the high pressure texturizing valve 18, which will be subsequently described. The pump 16, operating against the high pressure valve 18, forces the aerated and chilled fat 10 through the discharge line 15a, under this high pressure, into an agitating device 19.

In the device 19 the fat is subjected to a heat treatment and agitated while still under high pressure. The device 19 consists of a tube 20 in which are mounted a number of rotating blades 21 supported by a longitudinal shaft 22. The tube 20 may be heated by means of a heated jacket 23 or heated by any other suitable means. This device is designed so that a pressure of 1000 pounds per square inch or more may be maintained upon the fat during this treatment. The fat is moved through the tube 20 at a uniform rate and is mixed and beaten thoroughly at the same time by means of the rotating agitator blades 21. During this time the necessary amount of heat to properly condition the fat is applied by the heat jacket 23 but without again reducing it to a fluid or melted state.

The fat, upon leaving the tube 20, is forced through the high pressure valve 18 located in the discharge line 15b. This valve 18 contains an orifice which may be in the form of a slot, perforated plate, or other shape, but in this case proportioned so that a pressure of 500–1000 pounds per square inch may be maintained.

Due to the above mentioned heat treatment it is evident that a more uniform consistency is produced in the shortening before it is forced through the high pressure orifice than were it passed in a cold lumpy condition directly from the "picker-box" to the high pressure orifice. As a result of the heat treatment preceding the discharge from the high pressure orifice, it has been found that a far more uniform shortening is obtainable than heretofore. The body of this shortening is exceptionally smooth and free from any lumps and the air content thereof is thoroughly dispersed.

This intermediate heat treatment serves the important function of promoting a certain stabilizing condition of the shortening as well as thoroughly beating or whipping it into a more or less homogeneous consistency. The fat comes from the picker-box 13 in a semi-solid condition.

Some of it has been cooled to a hard, lumpy condition, whereas other portions are more or less liquid, and it has been found that gentle heat treatment at this point under pressure followed by a high pressure squeezing or texturizing operation promotes the formation of highly desirable types of crystals so that the finished product is plastic and workable rather than short and brittle.

For some fat formulae the above described high pressure and heat treatment processing is entirely sufficient, so that the product is ready to be filled into tins or other packages in the usual manner. For this purpose an outlet valve 24 is connected to the discharge line 15b. The tins, barrels or other containers may be filled with the treated fat by operation of the valve 24.

In the case of more difficult blends, however, it is desirable to continue the operation by closing the valve 24 and forcing the treated fat through the remaining devices shown in the drawing to the right of the valve 24. This further treatment is effected in the following manner: The fat, upon leaving the high pressure valve 18, is discharged through the line 15b into a tempering device 25. This device 25 is preferably a long covered chamber 26 adapted to hold a considerable mass of shortening. There is a rotatable longitudinal shaft 27 carrying a series of blades 28 within the chamber. The level of the shortening within the chamber is preferably maintained above or at the uppermost zone of rotation of the blades. In this further treatment of the fat, time is an important factor allowing the previous heating operation to become fully effective and permit a change in crystalline structure. The fat is slowly moved, by means of the rotating blades 28, from the inlet end of the chamber 26 to the outlet end. During this time the texture of the fat is further modified to produce a soft, fluffy and creamy mass. The tempered fat has a less oily characteristic for one thing upon leaving the chamber 26 than it has upon entering this tube.

The fat is withdrawn from the tempering device 25 by means of a second high pressure pump 29 operated by a suitable motor 30. This pump 29 works against a second high pressure valve 31 similar to the high pressure valve 18 and is capable of maintaining a pressure of 500–1000 pounds per square inch in the discharge line. The valve 31 contains a narrow orifice similar to that described in connection with the valve 18. The pump 29 forcing the fat through this narrow orifice causes complete and final texturating of the fat in such a manner as to eliminate any and all lumps or other hard particles that have not been removed by the preceding treatment, and further tends to break down any agglomerates present and cooperates with the tempering treating to give a stable product and one free from an undesirable crystalline structure.

By means of the above described operations, using these high pressure types of pumps and valves, the fat is texturated and tempered in a manner not obtainable by any of the prior systems. The high pressure operation characteristic of the invention causes, by itself, a heating of the fat which is beneficial in producing the desired characteristics in the final product. In fact, we have found that by operating the high pressure pumps and valves at extremely high pressures, such as 500–1000 pounds per square inch, that no additional heat is necessary. This means that in some cases the heating jacket 23 surrounding the tube 20 of the device 19 would not have to be utilized, for the heat generated by the high pressure can be utilized by suitable adjustment of the valves and pressure to add sufficient heat to the fat to raise it to a temperature at which it is suitably softened and conditioned to facilitate the tempering and texturating operations.

By the expression "conditioning" we refer to the operation of softening the fat by agitating it under pressure and/or with heat.

The fat, upon passing through the last high pressure texturizing valve 31, is discharged into the outlet pipe 32 and is discharged from this pipe into suitable containers 34 by operation of the outlet valve 33.

The pumps employed in the above described system are of conventional type, either rotary or reciprocating, but of such construction as to maintain the desired pressures specified. The orifices in the high pressure valves 18 and 30 may be of any suitable form, straight, circular, fixed, or adjustable. Although the exact type of orifice is not of importance, it must function, however, so as to back up a high pressure on the pump line 15, preferably from 500 to 1000 pounds per square inch although somewhat lower and higher pressures may be used dependent upon the fat formula. It is of importance in the operation of this invention that the shortening be subjected to this pressure and released therefrom through an orifice in order that the product may assume a smooth, creamy texture and the air content therein be uniformly and finely dispersed.

The expression "texturizing" or "texturating" refers to an operation which takes place subsequent to the chilling, aerating and conditioning of the shortening and consists in forcing the fat, which is maintained in a condition capable of being pumped, through an orifice by a relatively high pressure and releasing the fat into a zone of virtually atmospheric pressure. The expression "texturating zone" and "texturizing zone" refers to that portion of the system which includes a small orifice or valve through which the shortening is forced by a relatively high pressure and extruded into a low pressure zone.

According to a preferred example, the shortening may be taken from the refrigerating roll at a temperature of 46° F. to 68° F., depending upon the particular formula in use. The picker box would incorporate in this fat approximately 10% of air, and in the heating and agitating device, such as 19 shown in the drawing, the fat would be raised to a temperature of 68° F. to 86° F. The fat finally discharged into the containers is maintained in the range of 73° F. to 86° F., depending, as in the other instances, upon the particular stock being processed. The pressures used in this case would be approximately 600 to 1000 pounds per square inch. As may be noted, the temperature cited above covers a range, but this is not to be considered as a fluctuating condition existing during the working of any individual lot. The optimum temperatures at which the fat should be finished cannot be specified precisely, but are covered by the characteristics of the particular stock in process.

While the above described sequence of the texturating and tempering steps may be considered preferable, the process is not limited by this exact arrangement. The system may be operated by pumping the fat directly through the first high pressure orifice and thence through the heat exchanger, which in this case would not be under pressure. It is obvious, however, that working in this manner the shortening will not be as smooth and well texturated as when it receives the heat or other conditioning treatment before going through the high pressure orifice as described in the preferred method.

As will be evident to those skilled in the art, the improved process, as carried out by means of the above described system, according to the foregoing specifications accomplishes several distinct and advantageous results. The appearance of the resulting product is uniformly smooth and free from lumps. The finely and uniformly dispersed air content contributes toward a white satiny appearance, avoiding a shiny and vaseline-like semblance. This characteristic is maintained in the finished product for a long period of time after manufacture as the shortening is processed to a stable form. The treatment also results in the superior plasticity of the finished product, due to the crystal structure, its physical properties being particularly suited for the baker's use in obtaining a maximum volume and superior texture in bakery products.

What is claimed is:

1. The process of finishing fats to form a substantially dry plastic shortening, which comprises chilling the fat to a semi-solid form, aerating the chilled fat, simultaneously heating and agitating the aerated fat, forcing the heated and agitated fat through a small texturizing orifice under pressure, allowing the fat to move slowly without any material addition or subtraction of heat, and again texturizing the fat under pressure through a second small orifice.

2. The process of finishing fats to form a substantially dry plastic shortening, which comprises aerating semi-solid chilled fat, simultaneously heating and agitating the aerated fat under pressure, forcing the fat through a high pressure texturizing device, agitating the fat without any material addition or subtraction of heat, and again forcing the fat through a high pressure texturizing device.

3. The process of finishing fats to form a substantially dry plastic shortening, which comprises aerating semi-solid chilled fat, simultaneously heating and agitating the fat under pressure, and subsequently texturizing the fat by forcing it through a small orifice under pressure.

4. The process of finishing substantially dry plastic shortening comprising aerating a semi-solid chilled fat, simultaneously heating and agitating the fat to condition it for subsequent texturizing, and then texturizing said fat by forcing it through a small orifice under pressure.

5. The process of finishing substantially dry plastic shortening comprising aerating a semi-solid chilled fat, simultaneously heating and agitating the fat to condition it for subsequent texturizing, and then texturizing said fat by forcing it through a small orifice under a pressure of approximately 500 to 1,000 pounds per square inch.

TRUMAN M. GODFREY.
VICTOR SERBELL.